(12) United States Patent
Sehnert et al.

(10) Patent No.: US 12,433,554 B2
(45) Date of Patent: Oct. 7, 2025

(54) PHYSIOLOGICAL ANALYSIS FROM VIDEO X-RAY IMAGING

(71) Applicant: CARESTREAM HEALTH, INC., Rochester, NY (US)

(72) Inventors: William J. Sehnert, Fairport, NY (US); Xiaohui Wang, Pittsford, NY (US); Levon O. Vogelsang, Webster, NY (US); David H. Foos, Webster, NY (US)

(73) Assignee: Carestream Health, Inc., Rochester, NY (US)

( * ) Notice: Subject to any disclaimer, the term of this patent is extended or adjusted under 35 U.S.C. 154(b) by 198 days.

(21) Appl. No.: 18/552,697

(22) PCT Filed: Mar. 15, 2022

(86) PCT No.: PCT/US2022/020284
§ 371 (c)(1),
(2) Date: Sep. 27, 2023

(87) PCT Pub. No.: WO2022/203896
PCT Pub. Date: Sep. 29, 2022

(65) Prior Publication Data
US 2024/0164731 A1 May 23, 2024

Related U.S. Application Data

(60) Provisional application No. 63/164,598, filed on Mar. 23, 2021.

(51) Int. Cl.
*A61B 6/00* (2024.01)
*A61B 6/46* (2024.01)
(Continued)

(52) U.S. Cl.
CPC .......... *A61B 6/4452* (2013.01); *A61B 6/4405* (2013.01); *A61B 6/463* (2013.01);
(Continued)

(58) Field of Classification Search
CPC ..... A61B 6/4452; A61B 6/4405; A61B 6/463; A61B 6/486; A61B 6/50; A61B 6/541;
(Continued)

(56) References Cited

U.S. PATENT DOCUMENTS

2003/0016850 A1    1/2003  Kaufman et al.
2004/0092815 A1*   5/2004  Schweikard ......... A61N 5/1049
                                                          600/425
(Continued)

FOREIGN PATENT DOCUMENTS

WO    WO 2016/083068    6/2016

OTHER PUBLICATIONS

International Search Report mailed on Jul. 21, 2022 for International Application No. PCT/US2022/020284, 3 pages.

*Primary Examiner* — Kiho Kim
(74) *Attorney, Agent, or Firm* — Eugene I Shkurko

(57) ABSTRACT

A method for radiographic imaging of a patient directs imaging radiation to an anatomy of the patient using a radiographic imaging apparatus. A first image of the patient anatomy is captured in a digital detector, and one or more image acquisition factors are electronically stored. A second radiographic image of the same patient anatomy is captured by accessing and using the stored one or more image acquisition factors. A combination of the first and second radiographic images is displayed or transmitted.

20 Claims, 3 Drawing Sheets

(51) Int. Cl.
*A61B 6/50* (2024.01)
*A61B 6/58* (2024.01)

(52) U.S. Cl.
CPC ............... *A61B 6/486* (2013.01); *A61B 6/50* (2013.01); *A61B 6/541* (2013.01); *A61B 6/587* (2013.01)

(58) Field of Classification Search
CPC ......... A61B 6/587; A61B 6/542; A61B 6/588; A61B 6/5235; A61B 6/545
See application file for complete search history.

(56) References Cited

U.S. PATENT DOCUMENTS

| | | |
|---|---|---|
| 2008/0310698 A1 | 12/2008 | Boeing et al. |
| 2009/0079576 A1* | 3/2009 | Yankelevitz ........... A61B 6/037 340/573.7 |
| 2011/0110496 A1 | 5/2011 | Foos et al. |
| 2014/0341349 A1 | 11/2014 | Lalena et al. |

* cited by examiner

PHYSIOLOGICAL ANALYSIS FROM VIDEO X-RAY IMAGING

CROSS REFERENCE TO RELATED APPLICATIONS

This application claims the benefit of and is a U.S. National Phase filing of PCT Application PCT/US2022/020284 filed Mar. 15, 2022 entitled "PHYSIOLOGICAL ANALYSIS FROM VIDEO X-RAY IMAGING", in the name of Sehnert et al., which claims benefit of U.S. Patent Application Ser. No. 63/164,598, filed Mar. 23, 2021, in the name of Sehnert et al., and entitled PHYSIOLOGICAL ANALYSIS FROM VIDEO X-RAY IMAGING.

TECHNICAL FIELD

The disclosure relates generally to radiographic imaging of the human anatomy and more particularly to solutions for improving consistency of image content used for monitoring and assessment of patient condition.

BACKGROUND

There are a number of conditions for which radiographic images are particularly effective for revealing patient condition, status, and likely outcome to the clinician. In many instances, for example, patients in the Intensive Care Unit (ICU) who suffer from severe cardio-pulmonary disfunction, such as due to pneumonia or heart failure, are routinely monitored using chest x-rays. Chest x-ray images allow the attending team to evaluate disease progression or response to a course of treatment, as evidenced by lung opacifications. Clinical assessment of changes in the lungs can be obtained by comparing the current x-ray with a recent prior x-ray. As part of this assessment, the clinician can observe changes in opacification between most current and next recent images, and judge how much change there is in the patient condition, with image content evaluated to indicate improvement, worsening, or relative stability.

In addition to overall patient condition, the clinician may be further interested in the status of support tubing and related devices. For example, the patient may have various tubing apparatus inserted, such as endotracheal tube, feeding tubing, or central venous catheter. The proper position and functional aspects of such support devices can be observable in the captured images. Further, the clinician may also examine the periodic chest x-ray images for pneumothorax or other evidence of the presence of abnormal air pockets in the chest area.

While recently obtained chest x-ray images offer great benefits to the clinician, there are a number of factors with negative impact on evaluation accuracy. These can include:

(i) Inconsistent x-ray acquisition geometry. The acquisition geometry for a radiographic image involves the relative alignment of the x-ray tube, the patient, and the x-ray sensing detector. When comparing two chest x-ray images of the same subject taken at different times, positioning differences relating to components of the acquisition system can lead to difficulties in relating anatomic structures to each other and can make it difficult to ascertain the relative arrangement of tubing and support hardware features, as was noted above.

(ii) Differences in x-ray acquisition technique. Differences in technique settings, such as set energy (kVp) and intensity (mAs) levels, can significantly change the appearance of conditions such as pneumonia or pulmonary edema and lung disease in general.

(iii) Disparity in respiratory phase. Chest x-ray images can be obtained at different phases of respiration, such as full inspiration, full expiration, or some intermediate phase. Assessment of lung opacification requires image acquisition at full inspiration, otherwise spurious basal opacities can cause false positive findings. Pneumothoraces, on the other hand, are more conspicuous where images are acquired at full expiration.

(iv) Grayscale variability. Variations in grayscale presentation can confound accurate assessment for x-ray images of the same subject taken at different times or using different equipment. Inconsistent grayscale presentation in chest x-rays complicates the ability to assess changes in lung opacification by the clinician. Grayscale variability can also cause difficulties for automatic image assessment by a software algorithm.

It can be appreciated that there is a pressing need for methods that address problems that confound proper interpretation and use of x-ray images taken at different times, particularly for chest x-rays in the ICU environment.

SUMMARY

An object of the present disclosure is to address the need to obtain more consistent radiographic image content where x-ray images of the same patient may be taken at different times. Embodiments of the present disclosure include a number of solutions that can help to improve radiographic imaging consistency for a number of modalities, including those widely used in the ICU, thus alleviating some of the obstacles to more effective use of radiographic image technology.

According to one aspect of the disclosure, there is provided a method for radiographic imaging of a patient comprising directing imaging radiation from a radiation source to an anatomy of a patient using a radiographic imaging apparatus having a control processor. A first radiographic image of the patient anatomy is captured in a digital radiographic detector, and one or more image acquisition factors used for capturing the first radiographic image data is stored in an electronic memory by the control processor. A second radiographic image of the same patient anatomy is captured by accessing and using the stored one or more image acquisition factors. A combination of the first and second radiographic images may be displayed or transmitted.

These objects are given only by way of illustrative example, and such objects may be exemplary of one or more embodiments of the invention. Other desirable objectives and advantages inherently achieved may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE EMBODIMENTS

Figure 1:
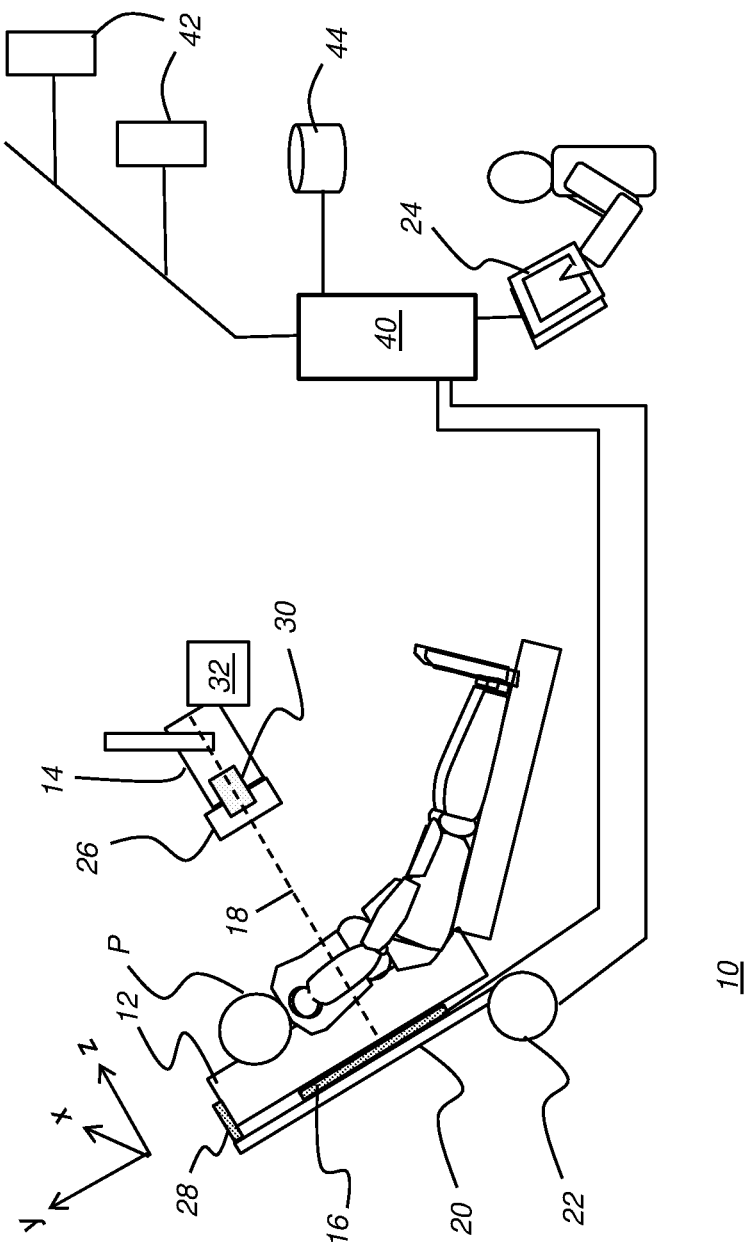
FIG. 1 is a schematic diagram that shows an exemplary arrangement of imaging components that can be used to form a radiographic imaging apparatus.

This application claims priority to U.S. Provisional application U.S. Ser. No. 63/164,598, provisionally filed on Mar. 23, 2021, entitled "PHYSIOLOGICAL ANALYSIS FROM VIDEO X-RAY IMAGING", in the names of Sehnert et al., which is hereby incorporated by reference herein in its entirety.

The following is a detailed description of the preferred embodiments, reference being made to the drawings in which the same reference numerals identify the same elements of structure in each of the several figures.

Various relative terms such as "above," "below," "top," "bottom." "height," "depth," "width," and "length," etc. may be used in the present disclosure to facilitate description of various embodiments. The relative terms are defined with respect to a conventional orientation of a structure and do not necessarily represent an actual orientation of the structure in manufacture or use. The following detailed description is, therefore, not to be taken in a limiting sense.

Where they are used, the terms "first", "second", and so on, do not necessarily denote any ordinal or priority relation, but may be used for more clearly distinguishing one element or time interval from another.

As used herein, the term "energizable" relates to a device or set of components that perform an indicated function upon receiving power and, optionally, upon receiving an enabling signal. The opposite state of "energizable" is "disabled".

The term "actuable" has its conventional meaning, relating to a device or component that is capable of effecting an action in response to a stimulus, such as in response to an electrical signal, for example.

The term "modality" is a term of art that refers to types of imaging. Modalities for a radiographic imaging system may be conventional x-ray, serial radiography or video x-ray, fluoroscopy, tomosynthesis, tomography, dual-energy, or other types of imaging that employ ionizing radiation directed through patient anatomy to a detector. Thus, references herein to "radiographic imaging" and "radiographic imaging apparatus" can apply for conventional x-ray, serial radiography, video x-ray, fluoroscopy, tomosynthesis, tomography, dual-energy, or other types of imaging using x-ray energy. The term "subject" refers to the patient who is being imaged and, in optical terms, can be considered equivalent to the "object" of the corresponding imaging system.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components or fields.

It will be understood that when an element is referred to as being "connected," or "coupled," to another element, it can be directly connected or coupled to the other element or intervening elements or magnetic fields may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

The term "exemplary" indicates that the description is used as an example, rather than implying that it is an ideal.

The term "in signal communication" as used in the application means that two or more devices and/or components are capable of communicating with each other in at least one direction via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

Embodiments of the present disclosure address the need for improved radiographic image consistency with solutions that can be applied over a broad range of image modalities. An area of particular need that can be addressed by employing solutions described herein relates to image consistency in the ICU and other critical care facilities in which periodic monitoring of patient condition includes repeated radiographic imaging sessions that capture images of the same anatomic region. Because the chest x-ray is widely used for ICU patients, embodiments described herein describe how solutions of the present disclosure can be implemented using the example of periodic chest x-rays. Embodiments of the present disclosure are not limited to chest x-rays, however, and other applications for patient conditions, anatomy, and imaging modes not specifically described herein can be apparent to those skilled in the radiographic imaging arts.

The schematic diagram of FIG. 1 shows an exemplary arrangement of imaging components that can be used to form a radiographic imaging apparatus 10. A patient P is disposed on a bed or other support platform 12 that has radio-translucent regions to allow image acquisition. An x-ray source 14 with a motorized x-ray collimator 26 directs radiation to a digital detector 16, with the emitted radiation energy represented by a central ray 18. Central ray 18 is preferably orthogonal to the planar incident surface of detector 16. A translation apparatus 20, such as an x-y stage driven by actuator 22, provides motion for suitably positioning detector 16 for receiving incident radiation that is conveyed through and near to the patient anatomy of interest. Detector 16 is in signal communication with a control logic processor 40. Image-bearing signals from detector 16 are sent to control logic processor 40. The signal data content can then be locally rendered on a display 24 that is in signal communication with processor 40. Control logic processor 40 has a memory 44 for storing acquisition parameters and acquired image data content. The image data content can also be transmitted to one or more networked processors 42 for further processing and storage.

A number of sensors can provide information that is needed to support automated positioning of imaging components or, alternately, to provide feedback that guides manual positioning. For example, an inclinometer 28 can be used to sense the relative inclination angle of detector 16. A camera 30 can be used to obtain reflectance images that show the relative alignment of x-ray source 14 to the patient anatomy. Camera 30 images can be used to detect one or more fiducials (not shown), used by processor 40 logic for positioning information. An actuator 32 provides angular and x- and y-axis translational movement in the plane of detector 16 (as shown by conventional x, y, and z axes in FIG. 1) for guiding the path of radiation from x-ray source 14 from the x-ray tube.

Figure 2:
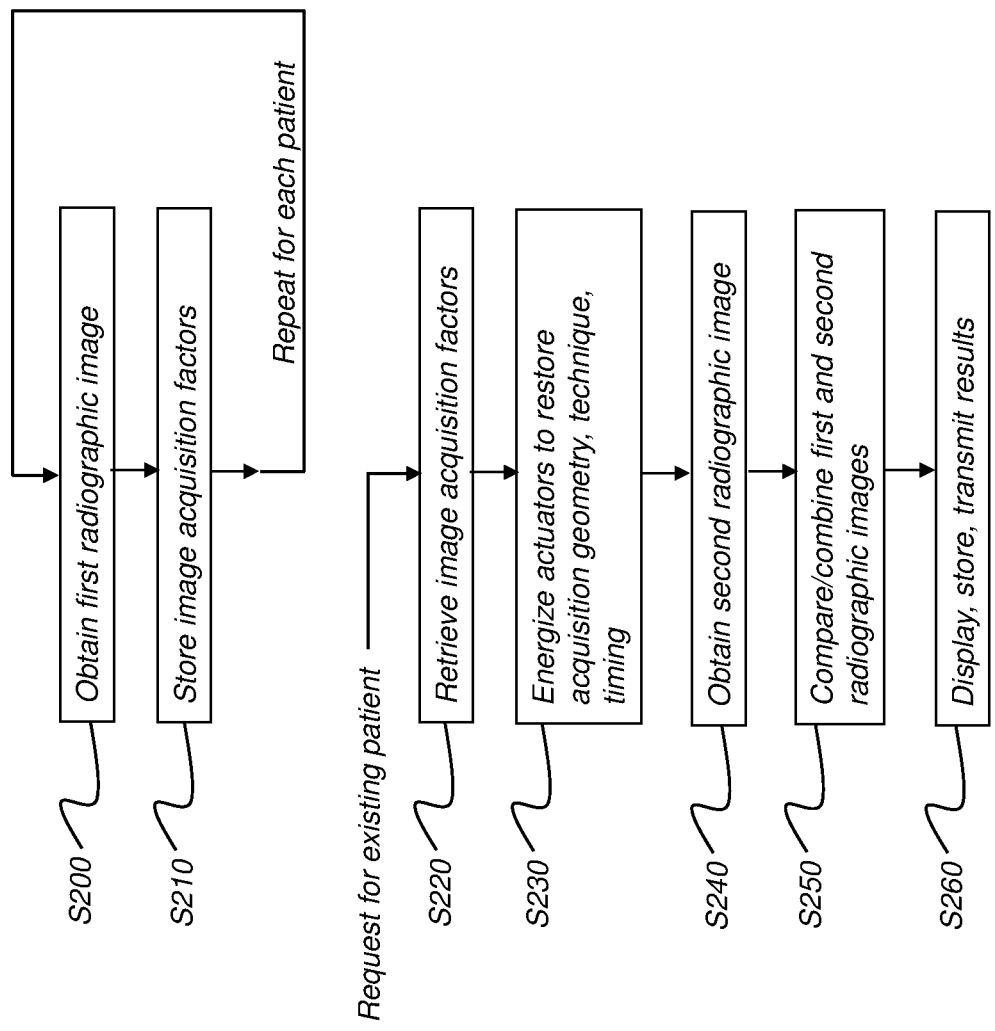
FIG. 2 is a logic flow diagram that shows a sequence for addressing image consistency for radiographic imaging.

The logic flow diagram of FIG. 2 shows a processing sequence for maintaining consistent rendering for radiographic images by tracking and controlling various factors that affect image appearance, geometry, and image-to-image registration according to an embodiment of the present disclosure. In an acquisition step S200, a first radiographic image is obtained, having an associated set of acquisition factors. A recording step S210 is executed, in which the set of acquisition factors or parameters used for the first image are recorded in memory and linked with the obtained first image and with the patient ID. The recorded acquisition factor data is then available for future use. Exemplary acquisition factor data that is recorded can include the following:

(i) X-ray acquisition geometry, including the various measurements that indicate the relative alignment of the x-ray tube of x-ray source 14 with detector 16 as well as distance between source 14 and detector 16. This can include translation as well as rotation data, for example. Image tube movement for tomosynthesis can also be recorded for matching.

(ii) Patient angular inclination, since this can be related to fluid effects and other complicating factors.

(iii) Image capture technique settings, including set energy (kVp) and intensity (mAs) levels.

(iv) Timing data for the respiratory cycle of the patient, as described subsequently.

In a subsequent imaging session, identification of the patient and type of exam needed can activate a retrieval step S220 in which the recorded acquisition factor data, as noted previously, can be accessed from memory and used to set up the imaging apparatus for acquiring a second radiographic image in a configuration step S230. As was described in the schematic diagram of FIG. 1, the imaging system logic can control one or more actuators that automatically set up the system configuration. Once the system configuration is consistent with the stored settings information, the subsequent image can be obtained in an acquisition step S240. The first and subsequent images can be combined and compared in a processing step S250. For example, subtraction can be applied, pixel by pixel, in order to ascertain how much difference there is between the images and to show more detailed information on patient condition.

According to an alternate embodiment of the present disclosure, an operator interface on display 24 (FIG. 1) can provide text, graphical, or audible instructions to guide manual adjustment of source and detector position. The operator interface can also provide data for technique settings and other information for use by the operator in configuring the imaging apparatus for obtaining consistent imaging results for subsequent images, based on stored configuration parameter data for previous images. Feedback from sensor detection can help to guide operator adjustment, indicating that dimensional or angular positioning does not match that used for previous exams and suggesting remedial modification, for example.

The sequence of FIG. 2 can be used for a wide variety of x-ray modalities, including conventional 2D radiographic imaging, tomosynthesis and other depth imaging modes, serial radiography or "video x-ray" imaging. Finally, a rendering step S260 appropriately displays or transmits the newly acquired imaging data. In general, embodiments may include using limited angle digital tomosynthesis captured images, serial radiography, general conventional x-ray radiographs, dynamic digital tomosynthesis, and dual energy captured images.

Using the same image technique settings can be particularly useful for obtaining consistency. Differences in these settings can change the appearance of lung disease, such as pneumonia or pulmonary edema, for example. Consistent grayscale presentation can help to identify various patient conditions.

Respiratory Cycle

It is widely acknowledged that motion of the anatomy can impact the appearance of the radiographic image and impair the task of image evaluation for the clinician. This can be particularly true for imaging of the chest, where patient movement due to breathing can affect the overall position of the patient and alter the relative relationship of ribs and other bone structures to lungs and other internal organs.

Difficulties such as those encountered in image analysis due to patient breathing, for example, have prompted the development of serial radiography or "video x-ray" techniques. Using serial radiography, a set of images is acquired, with the series of images sequentially obtained spanning the breathing cycle, for example. Serial radiography can be an effective imaging mode for capture of the repeated breathing cycle at successive phases.

In order to make an effective comparison between images taken in first and subsequent sessions, however, it is necessary to match the timing, or phases, of the breathing cycle from each session. Otherwise, comparison can be compromised by differences in relative position of the imaged features. Disparities for images acquired during different phases of the breathing cycle can be particularly difficult for machine-learning logic, complicating the needed computation power for properly compensating for differences in position.

Figure 3:
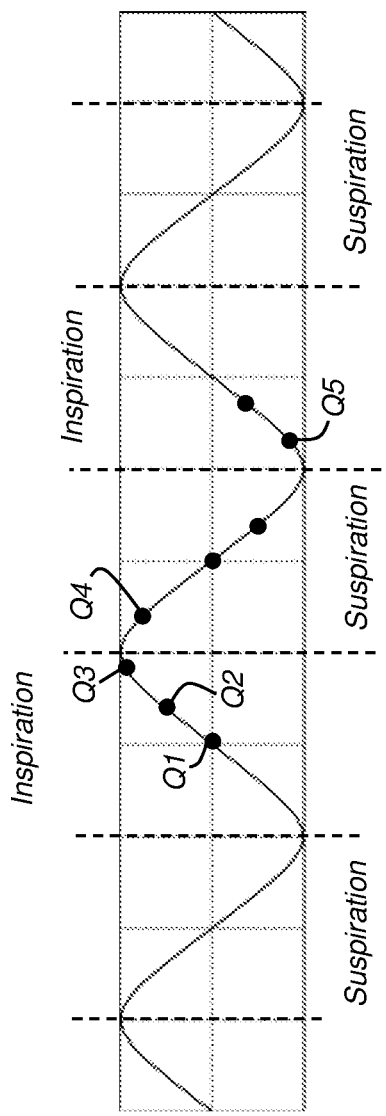
FIG. 3 is a timing chart that shows a patient breathing cycle.

The timing diagram of FIG. 3 shows, in simplified form, the normal breathing cycle, with recurring periods of inspiration and suspiration. Exemplary instants of the cycle are labeled Q1, Q2, . . . Q5 for illustration. It can be appreciated that the appearance and positioning of lung features for images captured at full inspiration, such as those captured with patient breathing at instants Q3 or Q4 for example, would differ from the appearance and positioning for images captured at or near full suspiration, such as at instant Q5 in FIG. 3.

To help improve the effectiveness of serial radiography for chest imaging, embodiments of the present disclosure track patient breathing during the radiographic exam and record the relative point in the breathing cycle that corresponds to each image obtained in the set of images obtained in the serial radiography series. Thus, for example, timing data relative to the breathing cycle can be stored for images in a first series in step S210, as described previously with reference to FIG. 2.

For obtaining chest x-ray images in a subsequent session, the relative timing of image captures to the breathing cycle can be tracked and recorded, allowing a close match between serial images of the first set, as described previously, and corresponding images of the subsequent series. Alternately, the timing of subsequent session can be matched to the timing of the first serial session. Thus, for example, acquisition of image content for both the first series of images and the second series of images can be triggered according to the patient breathing pattern, such as at full inspiration, or other suitable trigger condition related to movement of the patient, further allowing the two breathing sequences to be compared, as well as facilitating the comparison of any two images taken at the same phase of the breathing cycle in each of their respective sessions.

Tracking of the patient breathing cycle can be performed using camera 30 (FIG. 1) that obtains reflectance images or a separate camera or sensor. A camera could be used, for example, to monitor patient breathing from the same position. According to an embodiment of the present disclosure, camera 30 can have depth measurement capability, such as that available using a LIDAR camera such as the REALSENSE™ LIDAR Camera from Intel®. Alternately, depth data can be obtained using an RGB-D color depth camera such as the time-of-flight AZURE KINECT DK depth camera from Microsoft. Based on camera images, processor 40 can control timing of single-mode x-ray images as well as timing to initiate serial radiography or correlate individual serial radiography series images. The breathing cycle can be stored as part of the patient record, for example.

Additional aspects may include temporal, grayscale and geometric registration of a more recent captured motion sequence with one or more prior series and leveraging pseudo-invariant features as tie, or anchor, points, i.e., features within the image that remain reasonably (pseudo) invariant to the breathing motion, while registering the other structures that vary in position and grayscale significantly during the breathing cycle.

Post-Processing of Image Content

Grayscale correction or normalization can be applied to image content as a tool for providing improved consistency.

As another post-processing operation, rib segmentation may be used for the quantification of respiratory volumes or changes in volumes versus prior images. This quantification method may be used as a proxy for tidal volumes or for musculoskeletal breathing recruitment and/or differences thereof versus prior images.

Processing of the image content from different sessions can include digital subtraction, for example, or other pixel-to-pixel or grouped pixel processing techniques.

Machine Learning

One advantage of solutions described herein relates to improved image suitability for processing using machine learning. For example, a deep-learning based analysis of related physiologic imaging exams can be used to compare prior images to identify a change in a patient's condition (e.g., improved or worsened) and a magnitude of the change (e.g., numerically rated from 0-10). A severity of a patient's condition may be quantified, e.g., overall severity score for lung opacification. Prognostics may include probability of needing incubation within the next X number of days, and probability of mortality within the next X number of days.

Machine learning can also be used for providing initial setup of acquisition parameters, given various information about the patient condition.

It can be appreciated that methods described herein can be useful for any of the radiographic modalities, including fluoroscopy, wherein repositioning to align geometry of imaging apparatus and the patient may be particularly important. In particular, methods of the present disclosure can be useful for imaging modalities that require use of a mobile C-arm, wherein the imaging signal source needs to be moved in and out of the field in order to provide work-space for the attending practitioner.

By improving the consistency of image content, including not only position and geometry of the imaging setup, but also timing and post-processing of the image content, embodiments of the present disclosure simplify the task of providing data for more complex analysis and processing.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for radiographic imaging of a patient using a radiographic imaging apparatus having a control processor, an x-ray source, and a digital radiographic detector, the method comprising:
   directing radiographic energy from the x-ray source through the patient;
   capturing a first radiographic image of an anatomy of the patient in the detector;
   storing one or more image acquisition factors used for capturing the first radiographic image in an electronic memory accessible by the control processor;
   storing a trigger condition related to patient movement as one of said one or more image acquisition factors;
   capturing a second radiographic image of the anatomy of the patient by accessing and applying the stored image acquisition factors; and
   displaying or transmitting a combination of the first and second radiographic images.

2. The method of claim 1, further comprising storing an x-ray emission angle of the directed radiographic energy relative to a front surface of the detector as an acquisition factor.

3. The method of claim 2, further comprising attaching an inclinometer to a patient bed and determining an angular alignment of the x-ray source to the detector using the inclinometer.

4. The method of claim 1, further comprising storing a distance between the x-ray source and the detector as an acquisition factor.

5. The method of claim 1, further comprising storing an x-ray energy value in units of kVp as an acquisition factor.

6. The method of claim 1, further comprising storing an x-ray energy value in units of mAs as an acquisition factor.

7. A method for radiographic imaging of a patient using a radiographic imaging apparatus having a control processor, an x-ray source, and a digital radiographic detector, the method comprising:
   directing radiographic energy from the x-ray source through the patient;
   capturing a first radiographic image of an anatomy of the patient in the detector;
   storing one or more image acquisition factors used for capturing the first radiographic image in an electronic memory accessible by the control processor;
   storing a trigger condition related to patient movement as one of said one or more image acquisition factors, wherein the trigger condition comprises a breathing pattern of the patient;
   capturing a second radiographic image of the anatomy of the patient by accessing and applying the stored image acquisition factors; and
   displaying or transmitting a combination of the first and second radiographic images.

8. The method of claim 1, further comprising storing a grayscale presentation value as an acquisition factor.

9. The method of claim 1, further comprising capturing the first and second radiographic images each during a separate tomographic examination.

10. The method of claim 1, further comprising acquiring a series of radiographic images that each capture a different point in time during a respiratory cycle of the patient.

11. The method of claim 1, further comprising measuring patient inspiration using rib segmentation.

12. The method of claim 1, further comprising digitally subtracting the second captured radiographic image from the first captured radiographic image.

13. The method of claim 1, further comprising attaching a color depth camera to a collimator of the x-ray source, attaching fiducials to a patient bed, and determining an angular alignment of the x-ray source in relation to the digital detector using images of the fiducials captured by the color depth camera.

14. A method for radiographic imaging of a patient using a radiographic imaging apparatus having a control processor, an x-ray source, and a digital radiographic detector, the method comprising:
   directing radiographic energy from the x-ray source through the patient;
   capturing a first radiographic image of an anatomy of the patient in the detector;
   storing one or more image acquisition factors used for capturing the first radiographic image in an electronic memory accessible by the control processor;
   capturing a second radiographic image of the anatomy of the patient by accessing and applying the stored acquisition factors;
   displaying or transmitting a combination of the first and second radiographic images; and
   measuring a respiratory cycle of the patient and capturing the second radiographic image by timing activation of the x-ray source according to a preselected point of the measured respiratory cycle of the patient.

15. The method of claim 14, further comprising storing an x-ray emission angle of the directed radiographic energy relative to a front surface of the detector as an acquisition factor.

16. The method of claim 14, further comprising storing a distance between the x-ray source and the detector as an acquisition factor.

17. The method of claim 14, further comprising storing an x-ray energy value in units of kVp as an acquisition factor.

18. The method of claim 14, further comprising storing an x-ray energy value in units of mAs as an acquisition factor.

19. The method of claim 14, further comprising acquiring a series of radiographic images that each capture a different point in time during a respiratory cycle of the patient.

20. The method of claim 14, further comprising digitally subtracting the second captured radiographic image from the first captured radiographic image.

* * * * *